United States Patent
Isobe et al.

(10) Patent No.: US 9,295,091 B2
(45) Date of Patent: Mar. 22, 2016

(54) RADIO COMMUNICATION SYSTEM, COMMUNICATION CONTROL APPARATUS, AND COMMUNICATION CONTROL METHOD

(71) Applicant: NTT DOCOMO, INC., Tokyo (JP)

(72) Inventors: Shin-ichi Isobe, Tokyo (JP); Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/391,238

(22) PCT Filed: Apr. 16, 2013

(86) PCT No.: PCT/JP2013/061277
§ 371 (c)(1),
(2) Date: Oct. 8, 2014

(87) PCT Pub. No.: WO2013/157541
PCT Pub. Date: Oct. 24, 2013

(65) Prior Publication Data
US 2015/0133133 A1    May 14, 2015

(30) Foreign Application Priority Data

Apr. 18, 2012 (JP) .................. 2012-095078

(51) Int. Cl.
*H04W 72/00* (2009.01)
*H04W 76/02* (2009.01)
*H04W 68/00* (2009.01)

(52) U.S. Cl.
CPC ............ *H04W 76/023* (2013.01); *H04W 68/00* (2013.01); *H04W 68/005* (2013.01)

(58) Field of Classification Search
CPC ................................................. H04W 76/023

USPC .......................................... 455/458; 370/468
See application file for complete search history.

(56) References Cited

U.S. PATENT DOCUMENTS

2006/0072609 A1* 4/2006 Tanabe ............... H04W 76/022
                                                                370/468
2009/0017843 A1* 1/2009 Laroia ................ H04W 76/023
                                                                455/458

FOREIGN PATENT DOCUMENTS

| JP | 9-46752 A | 2/1997 |
| JP | 2005-33536 A | 2/2005 |
| JP | 2010-533440 A | 10/2010 |
| WO | 2009/009394 A1 | 1/2009 |

OTHER PUBLICATIONS

International Search Report for corresponding International Application No. PCT/JP2013/061277, mailed May 28, 2013 (1 page).
Written Opinion for corresponding International Application No. PCT/JP2013/061277, mailed May 28, 2013 (5 pages).
B. Bertenyi; "Key drivers for LTE success: Services Evolution;" 3GPP Seminar, LTE Asia; Sep. 6, 2011 (15 pages).

* cited by examiner

*Primary Examiner* — David Q Nguyen
(74) *Attorney, Agent, or Firm* — Osha Liang LLP (57) ABSTRACT

Provided are a radio communication system, a communication control apparatus, and a communication control method allowing radio communication terminals to call each other in a case where device-to-device direct communication (D2D communication) is provided using a radio access network such as LTE. A terminal 400A sends a communication control apparatus a paging signal containing a direct communication request requesting for direct communication with a terminal 400B. The communication control apparatus 200 sends the terminal 400B a paging signal containing information indicating that the terminal 400A is requesting direct communication and configuration information on a communication environment necessary for direct communication.

4 Claims, 7 Drawing Sheets

RADIO COMMUNICATION SYSTEM, COMMUNICATION CONTROL APPARATUS, AND COMMUNICATION CONTROL METHOD

TECHNICAL FIELD

The present invention relates to a radio communication system including multiple terminals configured to perform device-to-device direct communication (D2D communication), a communication control apparatus, and a communication control method.

BACKGROUND ART

Conventionally, Bluetooth (registered trademark) and ad-hoc mode of a wireless LAN are known as so-called Device-to-Device (D2D) communication that is a radio communication method in which multiple radio communication terminals (sometimes referred to simply as terminals hereinbelow) perform radio communication with each other directly without involving a radio base station or an access point. Such a radio method achieves short-range radio communication by using relatively-low radio transmission power. For this reason, it is difficult to use this radio communication method when the inter-terminal distance is long.

Against this background, it is being discussed to achieve the D2D communication by using a radio access network (e.g., UTRA (3G), E-UTRA (LTE), or GERAN (2G)) provided by a telecommunications carrier (e.g., Non-patent document 1).

In the case of using such radio access technology, the terminals use a frequency band which the telecommunications carrier is licensed to use by supervisory authorities, and therefore are enabled to output higher radio transmission power and achieve long-distance D2D communication without using resources on the network side such as a radio base station. Such a characteristic is considered particularly effective when the network side such as the radio base station is devastated by an earthquake or the like. Further, when the D2D communication is achieved using the frequency band used in a radio access network (such as 2G, 3G, or LTE) managed by a telecommunications carrier, the terminals can perform the D2D communication without being equipped with a module for another type of radio communication (e.g., Bluetooth (registered trademark)), which offers advantages such as cost and size reductions for the terminals.

PRIOR ART DOCUMENT

Non-patent Document

Non-patent document 1: "Key drivers for LTE success: Services Evolution," September 2011, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF THE INVENTION

However, performing D2D communication by using a radio access network provided by a telecommunications carrier has the following problem. Specifically, the above radio access network is based on the assumption that radio communication involves a radio base station. For this reason, in D2D communication between terminals, an originating terminal cannot directly call a terminating terminal even when the terminating terminal is within a range where radio communication is possible. In addition, the originating terminal cannot call the terminating terminal when a D2D communication function in the terminating terminal is disabled.

Thus, the present invention has been made in view of such circumstances, and has an objective of providing a radio communication system, a communication control apparatus, and a communication control method allowing radio communication terminals to call each other when device-to-device direct communication (D2D communication) is provided using a radio access network such as LTE.

A first feature of the present invention is summarized as a radio communication system including: an originating terminal configured to send a paging signal to call a terminating terminal; and a communication control apparatus configured to control direct communication between the originating terminal and the terminating terminal. Here, the originating terminal includes an originating-side paging processing unit configured to send the communication control apparatus the paging signal containing a direct communication request requesting for direct communication with the terminating terminal, and the communication control apparatus includes a paging signal transmission unit configured to send the terminating terminal a paging signal containing information indicating that the originating terminal is requesting direct communication and configuration information on a communication environment necessary for the direct communication.

A second feature of the present invention is summarized as a communication control apparatus which controls direct communication between an originating terminal and a terminating terminal, the originating terminal being configured to send a paging signal to call the terminating terminal, the communication control apparatus including a paging signal transmission unit configured to send the terminating terminal a paging signal containing information indicating that the originating terminal is requesting direct communication and configuration information on a communication environment necessary for the direct communication.

A third feature of the present invention is summarized as a communication control method performed by an originating terminal configured to send a paging signal to call a terminating terminal, and a communication control apparatus configured to control direct communication between the originating terminal and the terminating terminal, the method including the steps of: the originating terminal sending the communication control apparatus the paging signal containing a direct communication request requesting for direct communication with the terminating terminal; and the communication control apparatus sending the terminating terminal a paging signal containing information indicating that the originating terminal is requesting direct communication and configuration information of a communication environment necessary for the direct communication.

MODE FOR CARRYING OUT THE INVENTION

Next, an embodiment of the present invention will be described. Note that, in the following description of the drawings, same or similar reference signs denote same or similar elements and portions . In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Radio Communication System

Figure 1:
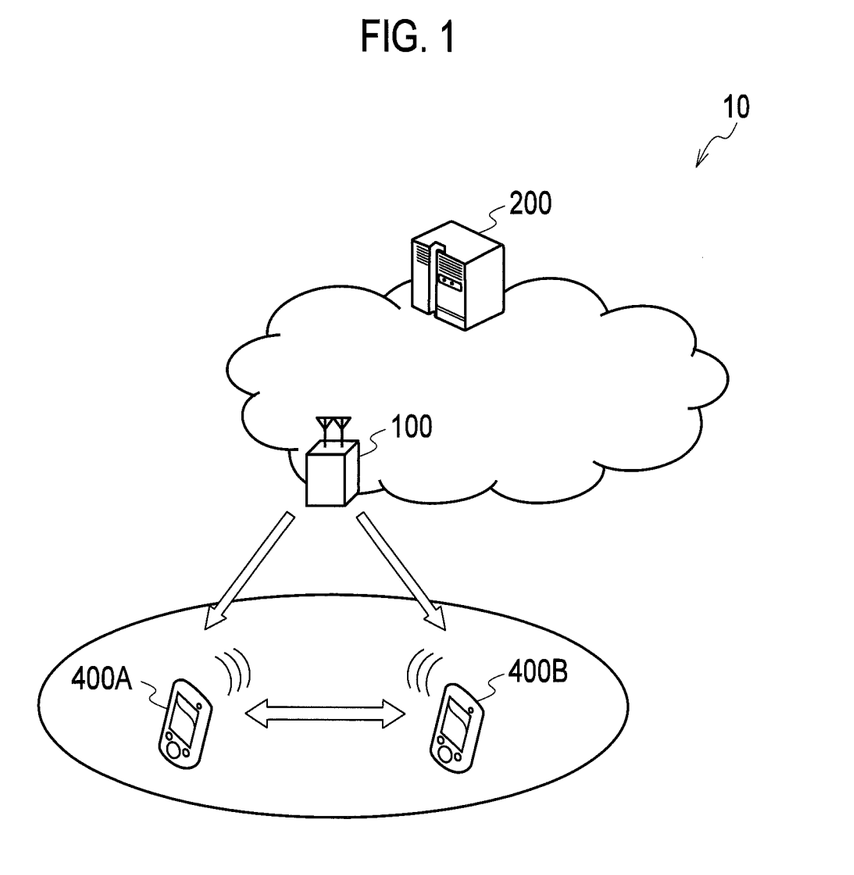
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes a radio base station 100, a communication control apparatus 200, and multiple radio communication terminals 400A, 400B (called terminals 400A, 400B below).

The radio base station 100 operates conforming to a radio access technology (RAT) standardized by 3GPP, e.g., Long Term Evolution (LTE).

The communication control apparatus 200 controls communication performed by the terminals 400A, 400B. More specifically, the communication control apparatus 200 controls communication performed by the terminals 400A, 400B by responding to notification information sent from the radio base station 100 or a communication request sent from the terminals 400A, 400B. In this embodiment, specifically, the radio base station 100 controls direct communication between the terminals 400A, 400B. Specifically, the communication control apparatus 200 controls direct communication performed between the terminal 400A and the terminal 400B without involving the radio base station 100, i.e., without involving a radio access network.

The terminal 400A and the terminal 400B are each a User Equipment (UE) configured to perform radio communication conforming to a radio access technology such as LTE. The terminal 400A (400B) can communicate with the terminal 400B (400A) via the radio base station 100 and can communicate directly with the terminal 400B (400A) without involving the radio base station 100.

In this embodiment, the terminal 400A configures an originating terminal sending a paging signal to call the terminal 400B, while the terminal 400B configures a terminating terminal being called by the terminal 400A.

(2) Functional Block Configuration of the Radio Communication System

Figure 2:
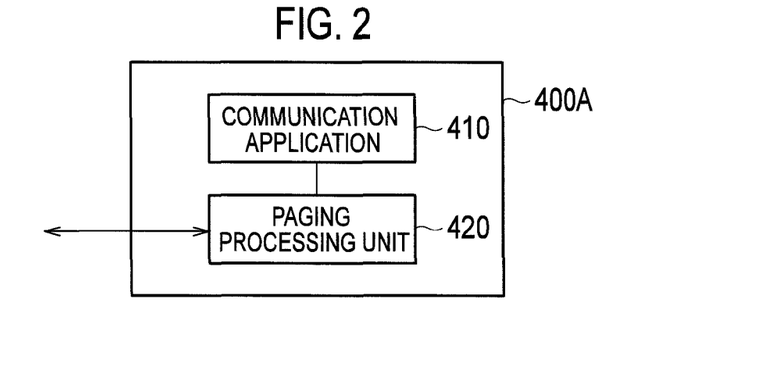
FIG. 2 is a functional block configuration diagram of a terminal 400A (an originating terminal) according to the embodiment of the present invention.
Figure 3:
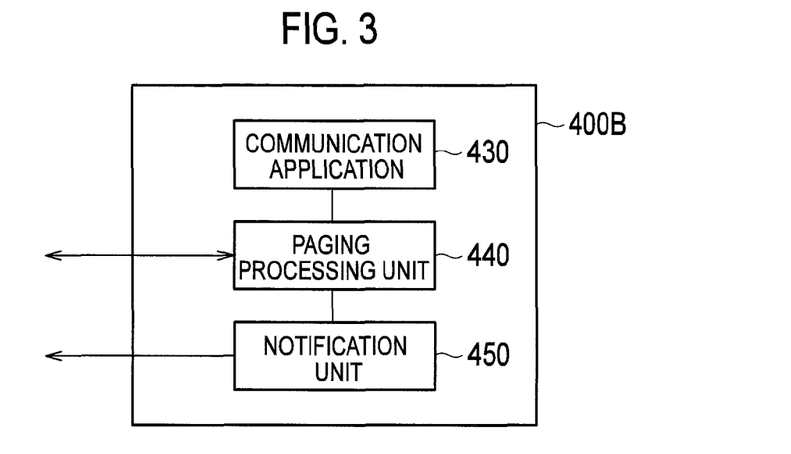
FIG. 3 is a functional block configuration diagram of a terminal 400B (a terminating terminal) according to the embodiment of the present invention.
Figure 4:
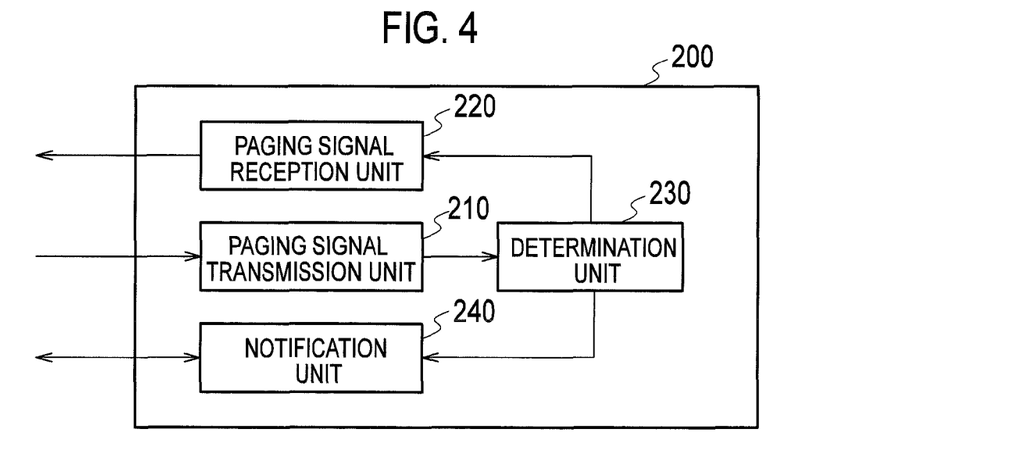
FIG. 4 is a functional block configuration diagram of a communication control apparatus 200 according to the embodiment of the present invention.

Next, a functional block configuration of the radio communication system 10 is described. Specifically, functional block configurations of the terminal 400A, the terminal 400B, and the communication control apparatus 200 are described. FIG. 2 is a functional block configuration diagram of the terminal 400A (an originating terminal), and FIG. 3 is a functional block configuration diagram of the terminal 400B (a terminating terminal). FIG. 4 is a functional block configuration diagram of the communication control apparatus 200.

(2.1) Terminal 400A

As shown in FIG. 2, the terminal 400A includes a communication application 410 and a paging processing unit 420.

The communication application 410 is a communication application executable in the terminal 400A, and is, for example, a voice communication application, a message service, and the like.

The paging processing unit 420 sends a paging signal based on a request from the communication application 410. More specifically, the paging processing unit 420 sends a paging signal to the communication control apparatus 200 via the radio base station 100, the paging signal containing a direct communication request requesting for direct communication with the terminal 400B. In this embodiment, the paging processing unit 420 configures an originating-side paging processing unit.

In response to a connection signal from the terminal 400B requesting for connection, the paging processing unit 420 responds to the terminal 400B that direct communication is possible, and performs direct communication with the terminal 400B. In addition, the paging processing unit 420 can also directly call the terminal 400B based on an affirmative notification (direct communication bit) notified of by the communication control apparatus 200 indicating that the terminal 400B can perform direct communication.

(2.2) Terminal 400B

As shown in FIG. 3, the terminal 400B includes a communication application 430, a paging processing unit 440, and a notification unit 450.

The communication application 430 is a communication application executable in the terminal 400B, and is, for example, a voice communication application, a message service, and the like.

The paging processing unit 440 directly calls the terminal 400A based on configuration information contained in a paging signal received from the communication control apparatus 200. More specifically, the paging processing unit 440 sends the terminal 400A a connection signal requesting for connection in response to a calling signal sent from the communication control apparatus 200 and relayed by the radio base station 100, and performs direct communication with the terminal 400A. Further, the paging processing unit 440 can also perform direct communication with the terminal 400A in response to a call from the terminal 400A. In this embodiment, the paging processing unit 440 configures a terminating-side paging processing unit. The paging processing unit 440 requests for activation of the communication application 430 necessary for the communication in response to the calling signal relayed by the radio base station 100 or the call from the terminal 400A.

The configuration information contained in the paging signal is configuration information on a communication environment necessary for direct communication, and contains a frequency band allowed for direct communication, the radio field intensity of radio signals, originating timing for the terminals 400A, 400B (timing of executing direct communication), an identifier (telephone number, a terminal identifier, and a subscriber identifier) of a counterpart (terminating) terminal, and the like.

When the paging processing unit 440 fails to call the terminal 400A by direct communication, the notification unit 450 notifies the communication control apparatus 200 that the terminal 400B failed to call the terminal 400A. In this embodiment, the notification unit 450 configures a terminal-side notification unit.

(2.3) Communication Control Apparatus 200

As shown in FIG. 4, the communication control apparatus 200 includes a paging signal reception unit 210, a paging signal transmission unit 220, a determination unit 230, and a notification unit 240.

The paging signal reception unit 210 receives a paging signal sent from the terminal 400A. More specifically, the paging signal reception unit 210 receives a paging signal containing a direct communication request requesting for direct communication with the terminal 400B. As the paging signal, Paging Message described in TS36.331 (Evolved Universal Terrestrial Radio Access (E-UTRA); Radio Resource Control (RRC); Protocol specification) can be used.

The paging signal transmission unit 220 sends a paging signal to the terminal 400B based on the paging signal received by the paging signal reception unit 210. More specifically, based on a command from the determination unit 230, the paging signal transmission unit 220 sends the terminal 400B a paging signal containing information indicating that the terminal 400A is requesting direct communication and configuration information on a communication environment.

The determination unit 230 determines whether direct communication can be performed by the terminal 400B or not based on the paging signal received from the terminal 400A. More specifically, the determination unit 230 can determine whether direct communication can be performed or not based on the distance between the terminal 400A and the terminal 400B. When the distance between the terminal 400A and the terminal 400B is equal to or smaller than a predetermined distance, the determination unit 230 may determine that direct communication can be performed, on condition that the terminal 400A and the terminal 400B send radio signals at a radio field intensity of a value equal to or smaller than a predetermined value which depends on the distance.

Alternatively, the determination unit 230 may determine that direct communication can be performed, if the terminal 400A and the terminal 400B are, for example, in the same cell, sector, tracking area, or the like or in adjacent cells, sectors, tracking areas, or the like.

When the determination unit 230 determines that direct communication can be performed, the notification unit 240 notifies the terminal 400A of an affirmative notification indicating that the terminal 400B can perform direct communication. In this embodiment, the notification unit 240 configures a network-side notification unit. The notification unit 240 may notify the terminal 400A of an affirmative notification containing the predetermined value of the radio field intensity of radio signals which depends on the distance.

In response to a notification from the terminal 400B that the terminal 400B failed to call the terminal 400A, the notification unit 240 can notify the terminal 400A that the terminal 400B failed to call the terminal 400A.

(3) Operation of the Radio Communication System

Next, operation of the above radio communication system 10 is described.

(3.1) Operation Example 1

Figure 5:
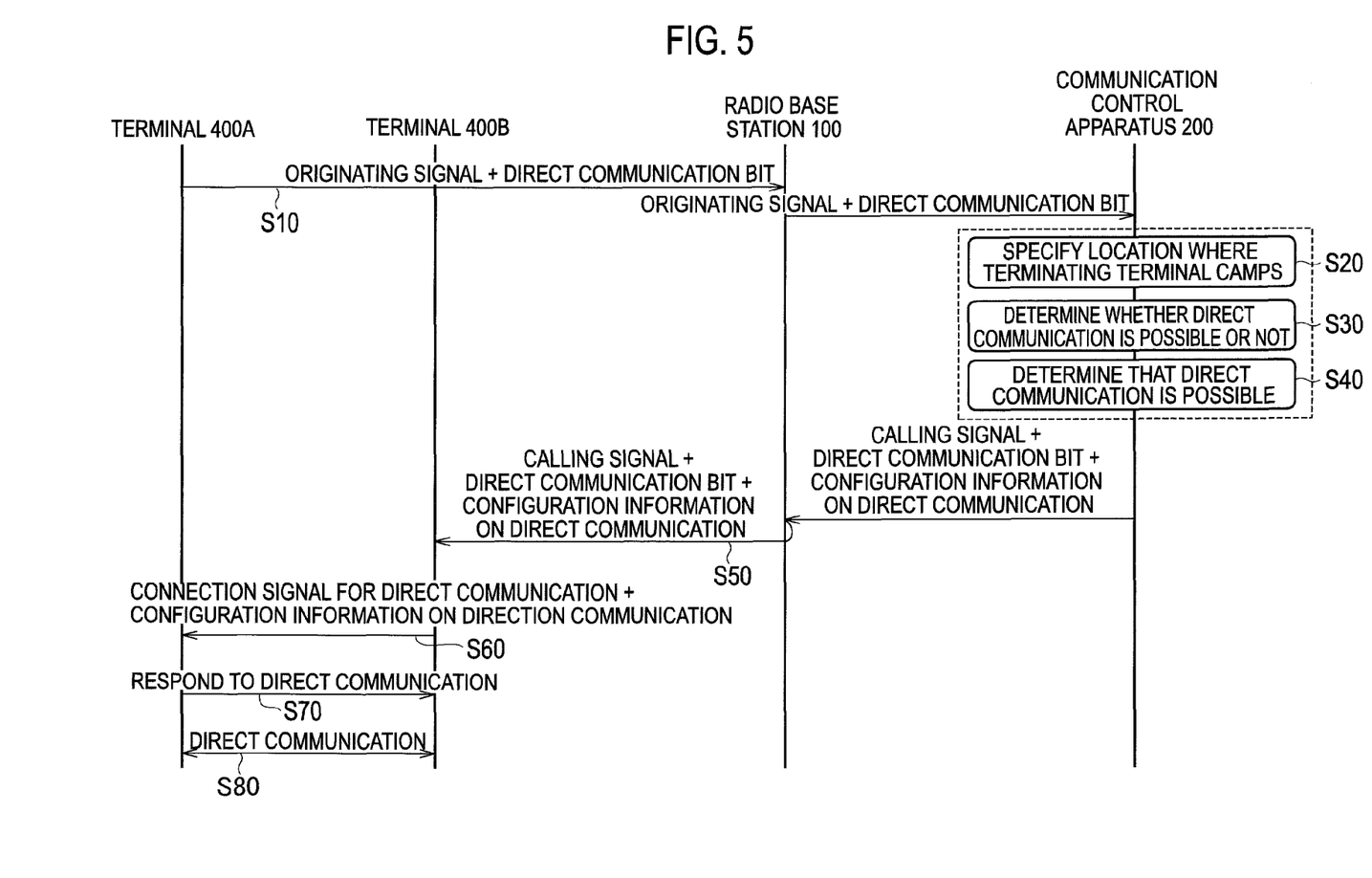
FIG. 5 is a diagram showing a communication sequence in which the terminals 400A, 400B perform direct communication, according to the embodiment of the present invention.

FIG. 5 shows a communication sequence in which the terminals 400A, 400B perform direct communication. As shown in FIG. 5, the terminal 400A sends the communication control apparatus 200 a paging signal for performing direct communication with the terminal 400B, or more specifically, an originating signal containing a direct communication bit requesting for direct communication (S10). The terminal 400A requests for direct communication according to the communication application to be executed, and designates an identification number (such as a telephone number) of the terminal 400B stored inside the terminal 400A.

The communication control apparatus 200 sends the terminal 400B a paging signal for performing direct communication between the terminal 400A and the terminal 400B, or more specifically, a calling signal containing a direct communication bit requesting for direct communication (S50).

The communication control apparatus 200 includes, in the paging signal, configuration information on direct communication, or more specifically, information such as a frequency band allowed for direct communication, the radio field intensity of radio signals, originating timing for terminals 400A, 400B (timing of executing direct communication), and an identifier of a counterpart terminal. When there are many direct communications being performed, the radio base station 100 monitors so that there may not occur interference and overlap in the configuration information necessary for direct communication.

Based on the paging signal received from the communication control apparatus 200, the terminal 400B directly connects to the terminal 400A without involving the radio access network (S60). More specifically, the terminal 400B generates a connection signal for direct communication based on the configuration information on direct communication, and sends the connection signal toward the terminal 400A. Note that the connection signal may be broadcasted to multiple terminals, or may be sent using a shared channel or individual channel.

The connection signal contains the configuration information on direct communication received from the communication control apparatus 200.

Upon receipt of the connections signal from the terminal 400B, the terminal 400A responds to the connection signal (S70) and establishes a communication channel to the terminal 400B based on the configuration information on direct communication received (S80).

In Operation Example 1 described above, the communication control apparatus 200 may further execute processing in Steps S20 to S40 to be described below (a part in a dotted frame in the drawing).

Based on the originating signal from the terminal 400A, the communication control apparatus 200 specifies a location where the terminating terminal (terminal 400B) camps (S20). The communication control apparatus 200 determines whether direct communication can be performed between the terminal 400A and the terminal 400B based on the positions of the terminal 400A and the terminal 400B, i.e., the distance between the terminal 400A and the terminal 400B (S30). In a case where the terminal 400A and the terminal 400B camp on areas (e.g., cells) formed by different radio base stations, if it is determined based on the distance between the terminal 400A and the terminal 400B that direct communication is possible, direct communication between the terminal 400A and the terminal 400B is allowed irrespective of the areas formed by the radio base stations.

The communication control apparatus 200 may reject the originating signal from the terminal 400A if determining that the terminal 400B is not allowed to perform direct communication or that the terminal 400B does not have a function for direct communication.

Herein, the communication control apparatus 200 determines that direct communication can be performed between the terminal 400A and the terminal 400B (S40).

(3.2) Operation Example 2

Figure 6:
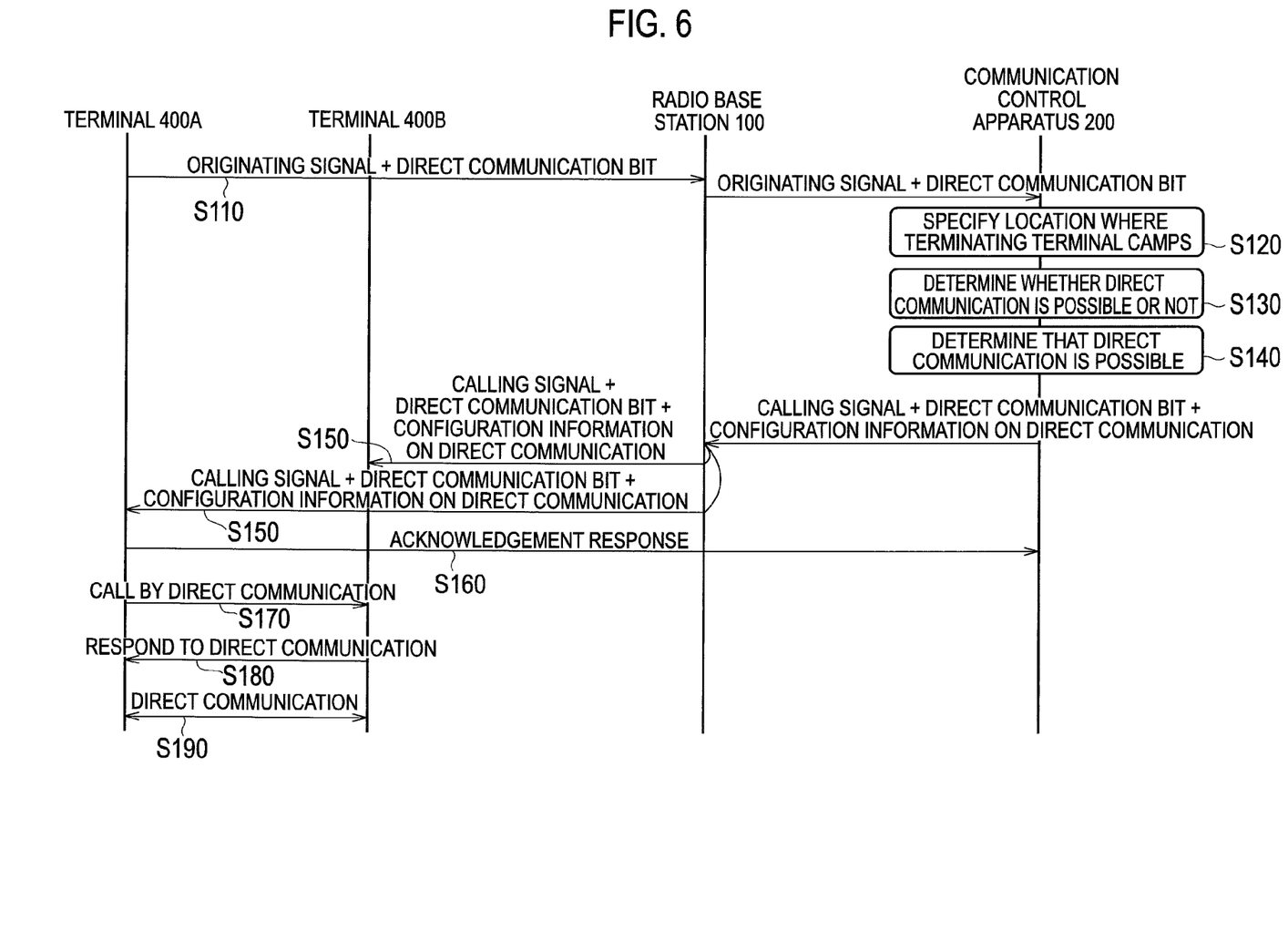
FIG. 6 is a diagram showing another communication sequence in which the terminals 400A, 400B perform direct communication, according to the embodiment of the present invention.

FIG. 6 shows another communication sequence in which the terminals 400A, 400B perform direct communication. In the communication sequence shown in FIG. 6, the terminal 400A directly calls the terminal 400B by direct communication.

As shown in FIG. 6, operation in Steps S110 to S150 is the same as that in Steps S10 to S50 of Operation Example 1. In Step S150, the terminal 400A receives the calling signal sent from the communication control apparatus 200, as the terminal 400B does.

Upon receipt of the calling signal, the terminal 400A sends the communication control apparatus 200 an acknowledgement response indicating that the terminal 400A has received the calling signal (S160). Further, the terminal 400A directly calls the terminal 400B based on the received configuration information on direct communication (S170) and establishes a communication channel to the terminal 400B (S180).

(3.3) Operation Example 3

Figure 7:
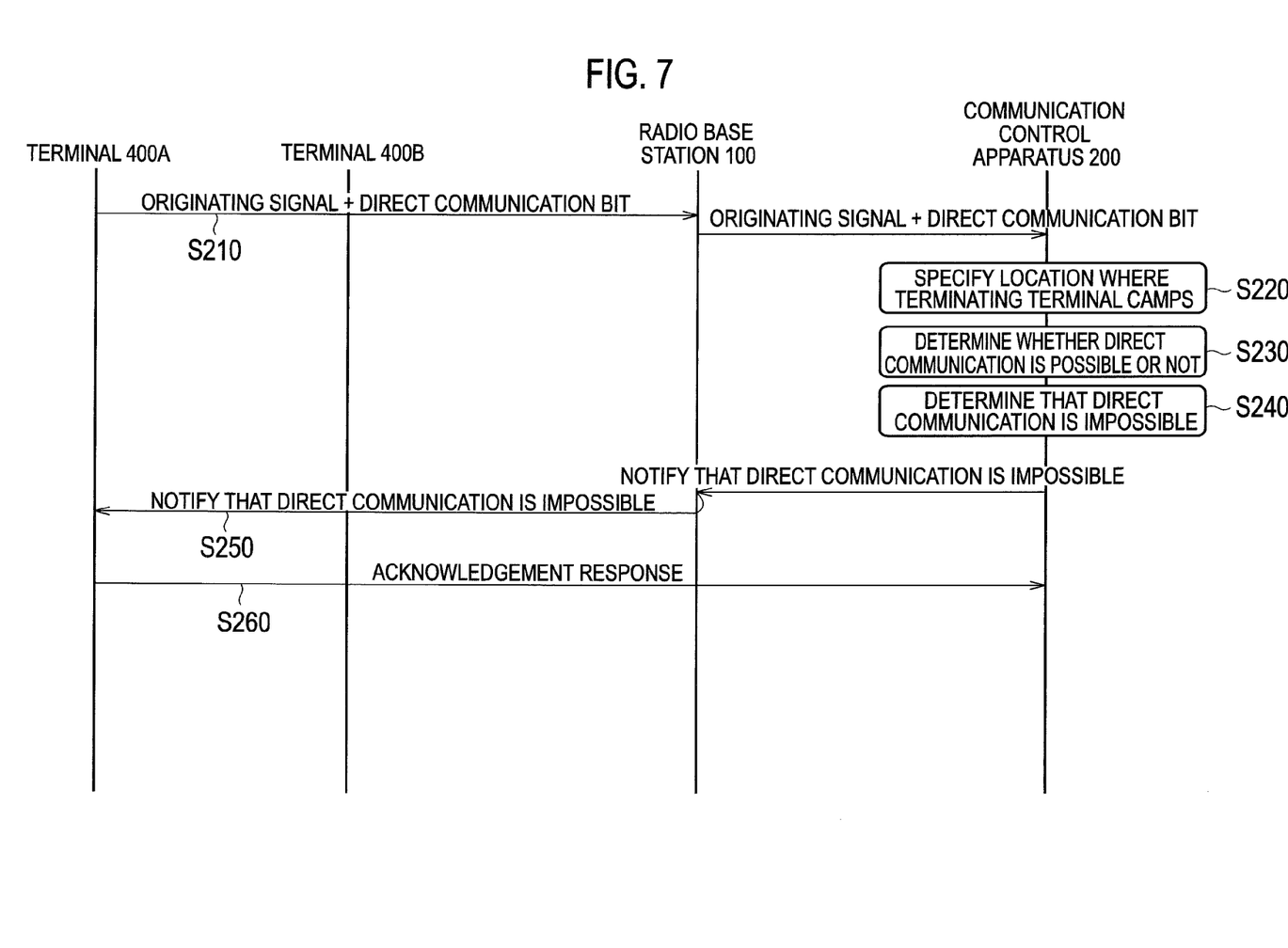
FIG. 7 is a diagram showing a communication sequence performed in a case where the terminals 400A, 400B cannot perform direct communication, according to the embodiment of the present invention.

FIG. 7 shows a communication sequence performed when the terminal 400A and the terminal 400B cannot perform direct communication. Operation in Steps S210 to S230 shown in FIG. 7 is the same as that in S10 to S30 of Operation Example 1.

The communication control apparatus 200 determines that the terminal 400A and the terminal 400B cannot perform direct communication because, for example, the distance between the terminal 400A and the terminal 400B is equal to or larger than a predetermined distance (S240). The communication control apparatus 200 sends the terminal 400A a direct communication reject notification indicating that the terminal 400A and the terminal 400B cannot perform direct communication (S250).

The terminal 400A may send an acknowledgement response upon receipt of direct communication reject notification (S260).

(3.4) Operation Example 4

Figure 8:
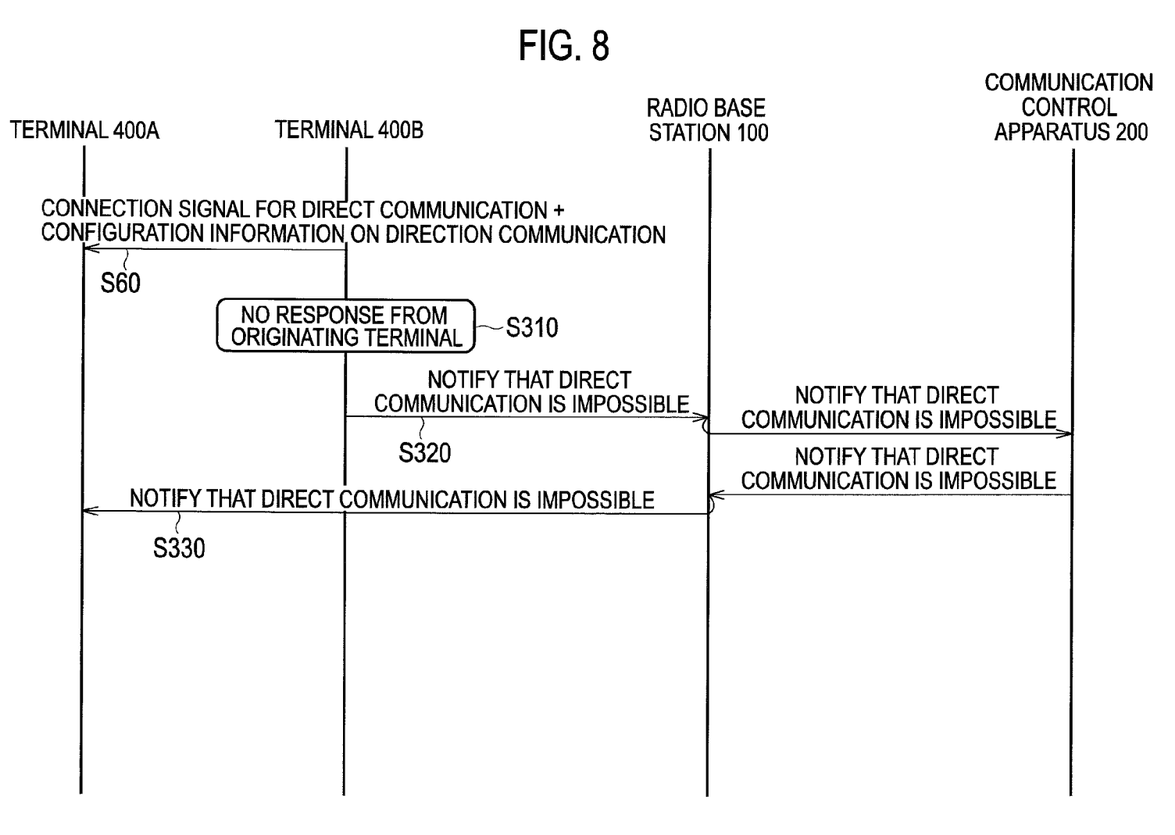
FIG. 8 is a diagram showing a communication sequence performed in a case where the terminal 400B calls the terminal 400A by direct communication, but the terminal 400A does not respond in Operation Example 1.

FIG. 8 shows a communication sequence performed when the terminal 400B calls the terminal 400A by direct communication in Operation Example 1 described above, but the terminal 400A does not respond. Possible reasons why the terminal 400A does not respond include, for example, a case where the terminal 400A (or the terminal 400B) moves out of the range where direct communication is possible after requesting direct communication.

As shown in FIG. 8, if there is no response from the terminal 400A within a predetermined period of time, the terminal 400B determines that the terminal 400A (originating terminal) is not responding (S310), and notifies the communication control apparatus 200 that the terminal 400B cannot perform direct communication with the terminal 400A (S320).

The communication control apparatus 200 may notify the terminal 400A, based on the notification from the terminal 400B, that the terminal 400B called the terminal 400A by direct communication but received no response (S330).

(4) Advantageous Effects

According to the radio communication system 10, the terminal 400A sends the communication control apparatus 200 a paging signal containing a direct communication request requesting for direct communication with the terminal 400B.

Then, the communication control apparatus 200 sends the terminal 400B a paging signal containing information indicating that the terminal 400A is requesting direct communication and configuration information on a communication environment necessary for direct communication. Then, the terminal 400B (or the terminal 400A) directly calls the terminal 400A (or the terminal 400B) based on the configuration information contained in the paging signal received from the communication control apparatus 200.

Thus, the terminals can directly call each other in a case where device-to-device direct communication (D2D communication) is provided using a radio access network such as LTE. Specifically, extension of an existing paging technique allows a terminal to easily call another terminal with which the terminal wants to perform direct communication.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

Although the above embodiment of the present invention describes an operation example where the terminal 400A or the terminal 400B calls its counterpart terminal by direct communication, the network side, specifically the communication control apparatus 200, may send the originating terminal a paging signal (originating signal).

Figure 9:
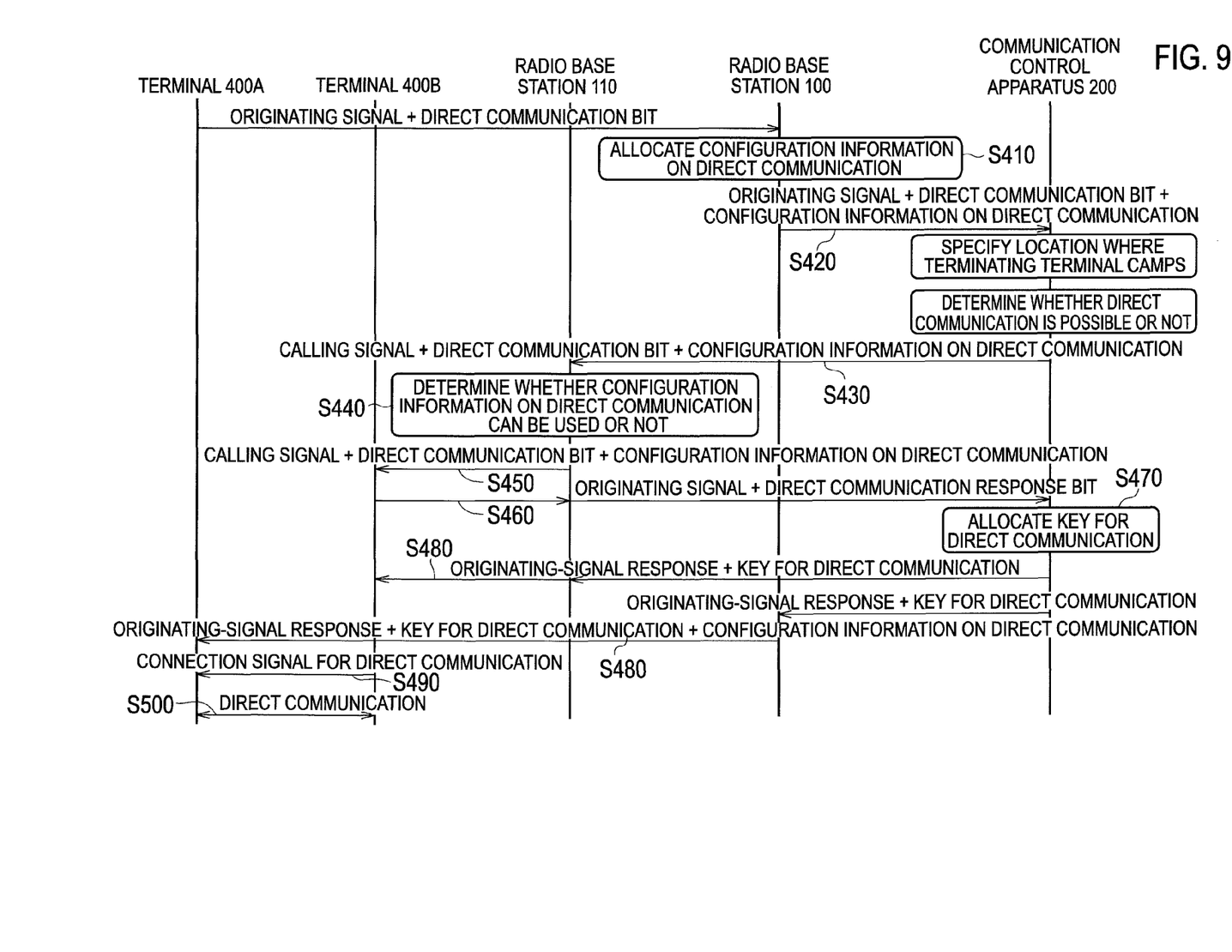
FIG. 9 is a diagram showing a communication sequence in which the terminals 400A, 400B perform direct communication, according to a modification of the present invention.

FIG. 9 is a diagram showing a communication sequence in which the terminals 400A, 400B perform direct communication, according to a modification of the present invention. The following description mainly focuses on differences from Operation Example 1 shown in FIG. 5, and points that are similar to those of Operation Example 1 may not be described again here. In this modification, the terminal 400A camps on a cell formed by the radio base station 100, and the terminal 400B camps in a cell formed by a radio base station 110 adjacent to the radio base station 100.

As shown in FIG. 9, upon receipt of an originating signal containing a direct communication bit requesting for direct communication from the terminal 400A, the radio base station 100 allocates configuration information on direct communication (such as a frequency band described above) to be used for the terminal 400A and the terminal 400B to perform direct communication (S410), and transfers the originating signal additionally containing the configuration information to the communication control apparatus 200 (S420).

The communication control apparatus 200 sends the radio base station 110 a paging signal for performing direct communication between the terminal 400A and the terminal 400B, or more specifically, a calling signal containing a direct communication bit requesting for direct communication and the configuration information allocated by the radio base station 100 (S430).

The radio base station 110 determines whether the configuration information contained in the calling signal received from the communication control apparatus 200 can be used in the cell formed by the radio base station 110 or not (S440). Herein, the radio base station 110 determines that the configuration information can be used.

The radio base station 110 sends the terminal 400B camping on its cell a calling signal containing a direct communication bit requesting for direct communication (S450). Upon receipt of the calling signal, the terminal 400B sends an originating signal to the communication control apparatus 200 via the radio base station 110, the originating signal containing a direct communication response bit for responding to direct communication bit (S460).

Upon receipt of the originating signal, the communication control apparatus 200 allocates a key for direct communication between the terminal 400A and the terminal 400B (S470), and sends an originating-signal response containing the key for direct communication to the terminal 400A via the radio base station 100 and to the terminal 400B via the radio base station 110 (S480). For example, the key for direct communication is used when the terminal 400A and the terminal 400B perform authentication of each other.

The terminal 400B directly connects to the terminal 400A without involving the radio access network (S490), and starts direct communication (S500).

According to such a modification, the terminal 400A and the terminal 400B are more likely to be able to perform direct communication even if they camp on different cells, e.g., adjacent cells.

Although the terminal 400A includes the communication application 410 and the paging processing unit 420 in the above embodiment, the terminal 400A may further include the functions of the paging processing unit 440 and the notification unit 450 of the terminal 400B. Similarly, although the terminal 400B includes the paging processing unit 440 and the notification unit 450, the terminal 400B may include the function of the paging processing unit 420 of the terminal 400A.

Although the above embodiment describes an example where the communication control apparatus 200 includes the determination unit 230, the operation of the determination unit 230 (Steps S20 to S40) is not essential, as shown in Operation Example 1 shown in FIG. 5. In other words, the communication control apparatus 200 does not have to include the determination unit 230.

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as a radio communication system 10 including: a terminal 400A (an originating terminal) configured to send a paging signal to call a terminal 400B (a terminating terminal); and a communication control apparatus 200 configured to control direct communication between the originating terminal and the terminating terminal. Here, the originating terminal includes a paging processing unit 420 (an originating-side paging processing unit) configured to send the communication control apparatus the paging signal containing a direct communication request requesting for direct communication with the terminating terminal, and the communication control apparatus includes a paging signal transmission unit 220 configured to send the terminating terminal a paging signal containing information indicating that the originating terminal is requesting direct communication and configuration information on a communication environment necessary for the direct communication.

In the first feature of the present invention, the terminating terminal may include a paging processing unit 440 (a terminating-side paging processing unit) configured to directly call the originating terminal based on the configuration information contained in the paging signal received from the communication control apparatus.

In the first feature of the present invention, the communication control apparatus may include a determination unit 230 configured to determine whether the direct communication is executable by the terminating terminal or not based on the paging signal received from the originating terminal, and notification unit 240 (a network-side notification unit) configured to notify the originating terminal of an affirmative notification indicating that the direct communication is executable by the terminating terminal, when the determination unit determines that the direct communication is executable, and the originating-side paging processing unit directly may call the terminating terminal based on the affirmative notification notified of by the communication control apparatus.

More, the determination unit may determine whether the direct communication is executable or not based on a distance between the originating terminal and the terminating terminal. And, when the distance between the originating terminal and the terminating terminal is equal to or smaller than a predetermined distance, the determination unit may determine that the direct communication is executable, on condition that the originating terminal and the terminating terminal send radio signals at a radio field intensity of a value equal to or smaller than a predetermined value which depends on the distance, and the network-side notification unit may notify the originating terminal of the affirmative notification containing the predetermined value.

Furthermore, the terminating terminal may include a notification unit 450 (a terminal-side notification unit) configured to notify the communication control apparatus of a failure of a call to the originating terminal when the terminating-side paging processing unit failed to call the originating terminal, and the communication control apparatus may include a notification unit 240 (a network-side notification unit) configured to notify the originating terminal that the terminating terminal failed to call the originating terminal.

A second feature of the present invention is summarized as a communication control apparatus 200 which controls direct communication between an originating terminal and a terminating terminal, the originating terminal being configured to send a paging signal to call the terminating terminal, the communication control apparatus 200 including a paging signal transmission unit configured to send the terminating terminal a paging signal containing information indicating that the originating terminal is requesting direct communication and configuration information on a communication environment necessary for the direct communication.

A third feature of the present invention is summarized as a communication control method performed by an originating terminal configured to send a paging signal to call a terminating terminal, and a communication control apparatus configured to control direct communication between the originating terminal and the terminating terminal. Here, the method may include the steps of: the originating terminal sending the communication control apparatus the paging signal containing a direct communication request requesting for direct communication with the terminating terminal; and the communication control apparatus sending the terminating terminal a paging signal containing information indicating that the originating terminal is requesting direct communication and configuration information of a communication environment necessary for the direct communication.

In the third feature of the present invention, the communication control method may further include the step of the terminating terminal directly calling the originating terminal based on the configuration information contained in the paging signal received from the communication control apparatus.

Note that the entire content of Japanese Patent Application No. 2012-095078 (filed on Apr. 18, 2012) is incorporated by reference in the present specification.

INDUSTRIAL APPLICABILITY

According to aspects of the present invention, what can be provided are a radio communication system, a communication control apparatus, and a communication control method allowing radio communication terminals to call each other in a case where device-to-device direct communication (D2D communication) is provided using a radio access network such as LTE.

EXPLANATION OF THE REFERENCE NUMERALS 10 radio communication system
100 radio base station
200 communication control apparatus
210 paging signal reception unit
220 paging signal transmission unit
230 determination unit
240 notification unit
400A, 400B radio communication terminal
410 communication application
420 paging processing unit
430 communication application
440 paging processing unit
450 notification unit

The invention claimed is:

1. A radio communication system comprising:
an originating terminal configured to send a paging signal to call a terminating terminal; and
a communication control apparatus configured to control direct communication between the originating terminal and the terminating terminal, wherein
the originating terminal includes an originating-side paging processing unit configured to send the communication control apparatus the paging signal containing a direct communication request requesting for direct communication with the terminating terminal, and
the communication control apparatus includes:
a paging signal transmission unit configured to send the terminating terminal a paging signal containing information indicating that the originating terminal is requesting direct communication and configuration information on a communication environment necessary for the direct communication,
a determination unit configured to determine whether the direct communication is executable by the terminating terminal or not based on the paging signal received from the originating terminal, wherein the determination unit determines whether the direct communication is executable or not based on a distance between the originating terminal and the terminating terminal, and
a network-side notification unit configured to notify the originating terminal of an affirmative notification indicating that the direct communication is executable by the terminating terminal, when the determination unit determines that the direct communication is executable,
wherein the originating-side paging processing unit directly calls the terminating terminal based on the affirmative notification notified of by the communication control apparatus,
wherein when a distance between the originating terminal and the terminating terminal is equal to or smaller than a predetermined distance, the determination unit determines that the direct communication is executable on condition that the on originating terminal and the terminating terminal send radio signals at a radio field intensity of a value equal to or smaller than a predetermined value which depends on the distance, and
wherein a network-side notification unit notifies the originating terminal of an affirmative notification containing the predetermined value.

2. A communication control apparatus which controls direct communication between an originating terminal and a terminating terminal, the originating terminal being configured to send a paging signal to call the terminating terminal, the communication control apparatus comprising:
a paging signal transmission unit configured to send the terminating terminal a paging signal containing information indicating that the originating terminal is requesting direct communication and configuration information on a communication environment necessary for the direct communication,
a determination unit configured to determine whether the direct communication is executable by the terminating terminal or not based on the paging signal received from the originating terminal, and
a network-side notification unit configured to notify the originating terminal of an affirmative notification indicating that the direct communication is executable by the terminating terminal, when the determination unit determines that the direct communication is executable,
wherein the originating-side paging processing unit directly calls the terminating terminal based on the affirmative notification notified of by the communication control apparatus,
wherein the determination unit determines whether the direct communication is executable or not based on a distance between the originating terminal and the terminating terminal,
wherein, when a distance between the originating terminal and the terminating terminal is equal to or smaller than a predetermined distance, a determination unit determines that the direct communication is executable, on condition that the originating terminal and the terminating terminal send radio signals at a radio field intensity of a value equal to or smaller than a predetermined value which depends on the distance, and
wherein a network-side notification unit notifies the originating terminal of an affirmative notification containing the predetermined value.

3. A communication control method performed by:
an originating terminal configured to send a paging signal to call a terminating terminal, and
a communication control apparatus configured to control direct communication between the originating terminal and the terminating terminal, the method comprising the steps of:
the originating terminal sending the communication control apparatus the paging signal containing a direct communication request requesting for direct communication with the terminating terminal;
the communication control apparatus sending the terminating terminal a paging signal containing information indicating that the originating terminal is requesting direct communication and configuration information of a communication environment necessary for the direct communication;

the terminating terminal directly calling the originating terminal based on configuration information contained in the paging signal received from the communication control apparatus, wherein the terminating terminal includes a terminal-side notification unit configured to notify the communication control apparatus of a failure of a call to the originating terminal when a terminating-side paging processing unit failed to call the originating terminal, and wherein the communication control apparatus includes a network-side notification unit configured to notify the originating terminal that the terminating terminal failed to call the originating terminal.

4. A radio communication system comprising:

an originating terminal configured to send a paging signal to call a terminating terminal; and a communication control apparatus configured to control direct communication between the originating terminal and the terminating terminal, wherein the originating terminal includes an originating-side paging processing unit configured to send the communication control apparatus the paging signal containing a direct communication request requesting for direct communication with the terminating terminal, the communication control apparatus includes a paging signal transmission unit configured to send the terminating terminal a paging signal containing information indicating that the originating terminal is requesting direct communication and configuration information on a communication environment necessary for the direct communication, the terminating terminal includes a terminating-side paging processing unit configured to directly call the originating terminal based on configuration information contained in the paging signal received from the communication control apparatus, the terminating terminal includes a terminal-side notification unit configured to notify the communication control apparatus of a failure of a call to the originating terminal when the terminating-side paging processing unit failed to call the originating terminal, and the communication control apparatus includes a network-side notification unit configured to notify the originating terminal that the terminating terminal failed to call the originating terminal.

\* \* \* \* \*